(12) United States Patent
Wang et al.

(10) Patent No.: US 8,806,051 B2
(45) Date of Patent: Aug. 12, 2014

(54) MULTIMEDIA FILE SHARING METHOD AND SYSTEM THEREOF

(75) Inventors: Chun-Yu Wang, Taichung (TW); Hsu-Cheng Lin, Kaohsiung (TW); Chia-Ying Tsai, Tainan (TW); Jian-Hong Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 65 days.

(21) Appl. No.: 13/370,292

(22) Filed: Feb. 9, 2012

(65) Prior Publication Data
US 2013/0138736 A1 May 30, 2013

(30) Foreign Application Priority Data

Nov. 25, 2011 (TW) .............................. 100143382 A

(51) Int. Cl.
*G06F 15/173* (2006.01)
(52) U.S. Cl.
USPC .......................................................... 709/231
(58) Field of Classification Search
CPC ................................................ H04N 21/2387
USPC ......................................... 707/667; 709/231
See application file for complete search history.

(56) References Cited

U.S. PATENT DOCUMENTS

| | | | | |
|---|---|---|---|---|
| 5,862,388 A * | 1/1999 | Danneels et al. | ............. | 710/260 |
| 6,578,068 B1 * | 6/2003 | Bowman-Amuah | .......... | 709/203 |
| 6,647,425 B1 * | 11/2003 | Chaddha | ........................ | 709/233 |
| 6,697,341 B1 * | 2/2004 | Roy | ............................... | 370/260 |
| 6,721,789 B1 * | 4/2004 | DeMoney | ...................... | 709/219 |
| 7,756,836 B2 * | 7/2010 | Aboulhosn et al. | ........... | 707/667 |
| 7,792,982 B2 * | 9/2010 | Padmanabhan et al. | ...... | 709/231 |
| 2004/0003090 A1 | 1/2004 | Deeds | | |
| 2004/0143672 A1 * | 7/2004 | Padmanabham et al. | ..... | 709/231 |
| 2005/0091316 A1 | 4/2005 | Ponce et al. | | |
| 2006/0149910 A1 | 7/2006 | Kim et al. | | |
| 2007/0005795 A1 * | 1/2007 | Gonzalez | ...................... | 709/232 |
| 2008/0034276 A1 * | 2/2008 | Ficco | ............................. | 715/201 |
| 2009/0327244 A1 | 12/2009 | Rizal | | |
| 2010/0020886 A1 * | 1/2010 | Raveendran et al. | .... | 375/240.27 |

(Continued)

OTHER PUBLICATIONS

Roxana Geambasu et al., "HomeViews: Peer-to-Peer Middleware for Personal Data Sharing Applications", SIGMOD'07, Jun. 11-14, 2007, pp. 1-12.

(Continued)

*Primary Examiner* — Kevin Bates
*Assistant Examiner* — Clarence D McCray
(74) *Attorney, Agent, or Firm* — Jianq Chyun IP Office

(57) ABSTRACT

A multimedia file sharing method and a system thereof are provided herein, which applies the virtual file technology to achieve near real time multimedia sharing and transparent receiving functions. In the method, an interface software system is established through a network to speed up playing of multimedia files by different multimedia players. The interface software provides a speeding up and near real time multimedia playing effect for sharing multimedia through the network, by which for different transmissions of multimedia files or for playing multimedia files with different formats, the multimedia player is not necessary to modify or add the software of the players to meet the streaming protocols or container. In addition, the interface software is capable of providing the effect of playing the multimedia files by the players with satisfied quality and near real time performance.

21 Claims, 13 Drawing Sheets

(56) References Cited

U.S. PATENT DOCUMENTS

| | | | |
|---|---|---|---|
| 2010/0048242 A1* | 2/2010 | Rhoads et al. | 455/556.1 |
| 2010/0332671 A1* | 12/2010 | Alfonso et al. | 709/230 |
| 2011/0106965 A1 | 5/2011 | Chun et al. | |
| 2012/0179833 A1* | 7/2012 | Kenrick et al. | 709/231 |
| 2012/0219055 A1* | 8/2012 | He et al. | 375/240.03 |
| 2012/0290688 A1* | 11/2012 | Nandakumar et al. | 709/219 |
| 2013/0094773 A1* | 4/2013 | Misra et al. | 382/233 |
| 2013/0138736 A1* | 5/2013 | Wang et al. | 709/204 |

OTHER PUBLICATIONS

Tommo Reti et al., DiMaS: Distributing Multimedia on Peer-to-Peer File sharing Networks, Multimedia'04, Oct. 10-16, 2004, pp. 1-2.

Ragib Hasan et al., A Survey of Peer-to-Peer Storage Techniques for Distributed File Systems, International Conference on Information Technology: Coding and Computing, vol. II, 2005, pp. 1-9.

Athicha Muthitacharoen et al., IVY: A Read/Write Peer-to-Peer File System, ACM SIGOPS Operating Systems Review—OSDI'02: Proceedings of the 5th symposium on operating systems, 2002, pp. 1-14.

* cited by examiner

| File format | File name | File length | Slice size | Sliced slice | Video length | totem 2.28.2 | mplayer |
|---|---|---|---|---|---|---|---|
| | | | | | | ↗ 322 | 324 ↗ |
| | | | | | | Read a slice sequence before playing | |
| .wmv | 3rddemo.wmv | 63M | 8M | 8 | 02:30 | 1, 8, 4 | 1 |
| .mpg | itrino8.mpg | 302M | 8M | 16 | 02:46 | 1, 16, 8 | 1, 16, 8 |
| .mp4 | PLD00195.mp4 | 953M | 80M | 13 | 02:28:46 | 1, 13, 7 | 1, 13 |
| .avi | cowry-blovers.avi | 732M | 8M 80M | 90 9 | 01:42:30 | 1, 90, 45, 89 1, 9, 5 | 1, 89, 90 1, 9 |
| .mov | DSCN5347.mov | 106M | 8M | 13 | 01:39 | 1, 13, 7 | 1, 13 |
| .rmvb | tvbt.rmvb | 652M | 8M 80M | 80 8 | 02:22:14 | 1, 80, 40 1, 8, 4 | 1, 80 1, 8 |

FIG. 3B

MULTIMEDIA FILE SHARING METHOD AND SYSTEM THEREOF

CROSS-REFERENCE TO RELATED APPLICATION

This application claims the priority benefit of Taiwan application serial no. 100143382, filed Nov. 25, 2011. The entirety of the above-mentioned patent application is hereby incorporated by reference herein and made a part of this specification.

BACKGROUND

1. Technical Field

The disclosure relates to a multimedia file sharing method and a system thereof, which applies the virtual file technology to achieve near real time multimedia sharing and transparent receiving.

2. Related Art

With great improvement of computation power of electronic device, and increasing of a network transmission bandwidth, more and more multimedia functions are provided. The quality requirement of the multimedia functions also becomes much higher than before. There are currently many multimedia file formats with a high quality, for example, a video files with more than 720p (1280×720) or 1080p (1920× 1080) in resolution, or a picture with more than 10 mega pixels.

However, when being shared through a network, the following two issues are required to be considered: whether a near real time sharing may be achieved, or whether transparent transmitting/receiving by different multimedia players with different multimedia formats may be provided.

Considering whether the near real time sharing may be achieved, it is required that when the multimedia is shared by multiple persons, if one party shares a multimedia content, the other users on line at the same time are enabled to start playing the multimedia content without waiting for a long time.

As for providing the transparent transmitting/receiving by different multimedia players with different multimedia formats, it indicates that the multimedia players are not necessary to modify or add the software modules of the players for different transmissions of multimedia files, to meet the streaming protocols or container.

In the light of the current technologies, the implementation methods are classified into streaming transmission (such as Youtube) and file transmission (such as bt, ftp, or the msn file transmission). However, the technologies cannot solve the aforesaid two aspects at the same time, due to the following problems.

For the multimedia video and audio streaming technology, the sharing solution may merely achieve a follow-up near real time sharing effect instead of a near real time effect. That is to say, a source is required to be processed first in the sharing solution, the multimedia data is transmitted to a server for storage, so that the data streaming are subsequently downloaded from the server when other users are intended to enjoy a film. In addition, the technology cannot effectively solve the problem of transparent transmitting/receiving by different multimedia players with different multimedia formats. The streaming technology is quite complex. Each multimedia format is required to have a container for a different streaming protocol.

Since the file network transmission technology is not directed to multimedia application, the problem of achieving the near real time sharing cannot be solved. That is to say, although exchanging data by using the file transmission method has developed for several decades and has a very wide application, for example, applications such as bt, ftp, msn or email, a user cannot enjoy the content of the multimedia until the transmission of the whole file is ended.

A peer-to-peer file sharing technology is disclosed in related documents. The document discloses a method for sharing a file on a network. The file is stored in a data folder which is named after a group name. The contents of the file are transmitted in a peer-to-peer way. The shared file is temporarily stored in a form of a virtual file in a computer of a shared party. In the peer-to-peer network group file sharing mechanism, the file is directly transmitted to a computer of the shared party without being sliced.

A method for peer-to-peer sharing, transmitting and distributing a multimedia file is disclosed in another related document. The structural diagram thereof is shown in FIG. 1. The document introduces a method for peer-to-peer sharing of media data on a network. A server system manages the shared data and provides functions such as user authentication and content browse of shared data so as to make sure that the contents of the media data are merely transmitted to an authorized user, providing a safe media sharing platform. The disclosed technology needs a server system to control and manage all shared files, and an authorized and authenticated user can obtain the contents of the files. A sharing space is managed by the system, and the shared file entities are stored in computers of the authorized and authenticated users.

However, all the technologies cannot achieve the near real time sharing and cannot provide the transparent transmitting/ receiving by different multimedia players with different multimedia formats.

SUMMARY

A multimedia file sharing method and a system thereof are introduced herein.

In an embodiment, in the multimedia file sharing method, a virtual multimedia file system is established at a sharing device, where the contents of the virtual multimedia file system are stored in a storage medium of one or more shared devices. The storage media of the shared devices communicates with the sharing device through a network. The virtual multimedia file system performs a multimedia file transmission training process to create a multimedia transmission training file. A metafile corresponding to a multimedia file to be shared is generated according to the multimedia transmission training file. The multimedia file is sliced into multiple slices and transmitted to the shared devices. The metafile is transmitted to the storage media of the shared devices so that the shared device is enabled to obtain, according to the metafile, the sliced slices of the multimedia file for playing.

In an embodiment, the multimedia file sharing system includes a first device and a second device. The first device includes a first virtual multimedia file system and a first storage medium, where the virtual multimedia file system performs a training process in advance to create a multimedia transmission training file, and stores the multimedia transmission training file in the first storage medium. The first virtual multimedia file system generates a metafile corresponding to a shared multimedia file according to the multimedia transmission training file, and slices the multimedia file into multiple slices. The second device includes a second virtual multimedia file system and a second storage medium, where the second device communicates with the first device through a network. While playing the multimedia file, the second device obtains the corresponding slices sequentially according to the metafile, temporarily stores the slices in the second storage medium, and then sequentially displays the slices according to the metafile through the second virtual multimedia file system.

In an embodiment, the multimedia file sharing system includes a sharing device and multiple shared devices. The sharing device includes a first virtual multimedia file system. The first virtual multimedia file system performs a training process in advance to create a multimedia transmission training file. The first virtual multimedia file system generates a metafile corresponding to a shared multimedia file according to the multimedia transmission training file, and slices the multimedia file into multiple slices. Each of the shared devices includes a second virtual multimedia file system and a storage medium. The second device communicate with the first device through a network. While playing the multimedia file, any one of the shared devices sequentially obtains the corresponding slices from the sharing device or the other shared devices according to the metafile, and stores the slices in the storage medium.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3B is a schematic flow chart illustrating reading of multimedia files with different formats by, for example, two different types of multimedia player software;

DETAILED DESCRIPTION OF DISCLOSED EMBODIMENTS

Figure 1:
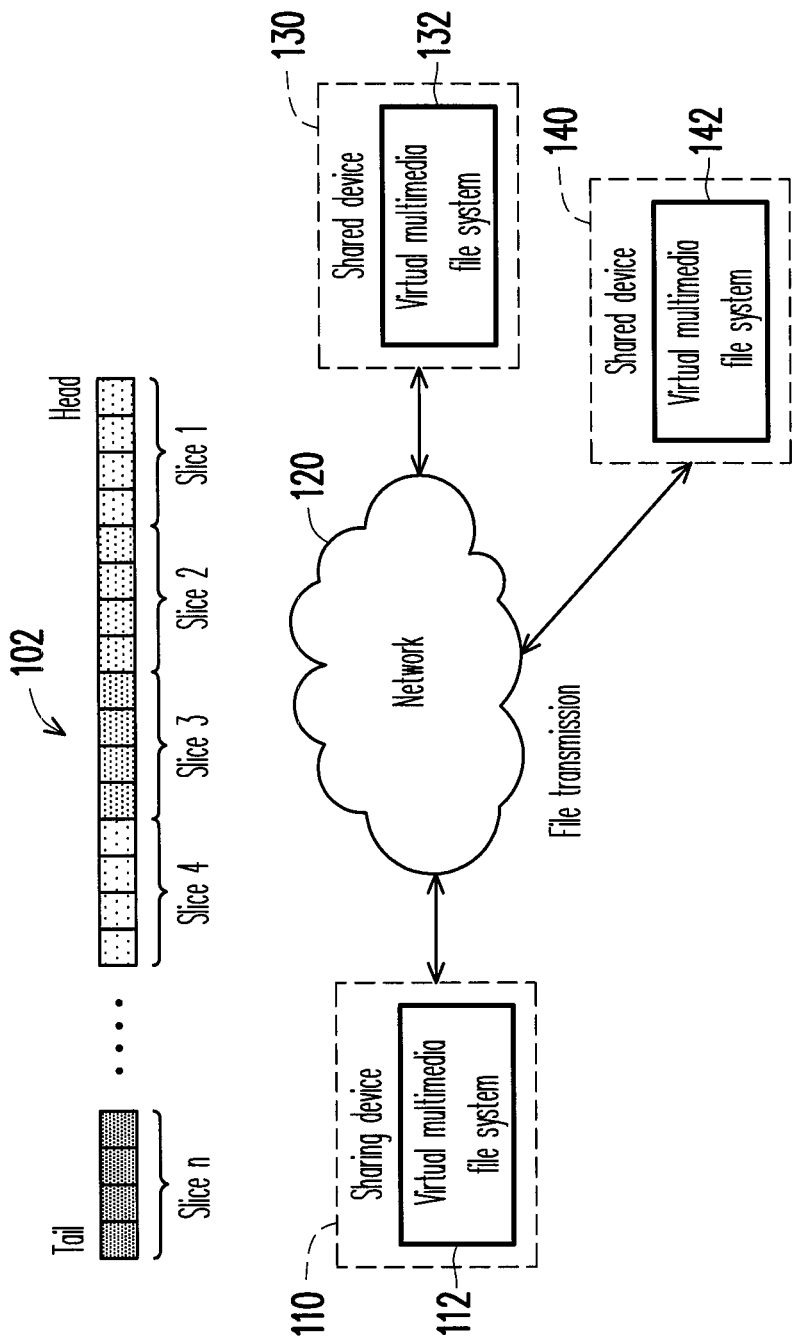
FIG. 1 is a schematic diagram illustrating architecture for achieving near real time multimedia sharing and transparent receiving according to one of the exemplary embodiments of the disclosure.

An embodiment provides a method for achieving near real time multimedia sharing and transparent receiving by applying the virtual file technology. In the method, an interface software system capable of cross-internet access and a transmission method thereof are established.

The disclosure provides a method for achieving near real time multimedia sharing and transparent receiving by applying the virtual file technology. In an exemplary embodiment, a proposed method can achieve near real time multimedia sharing and transparent transmitting/receiving by different multimedia players with different multimedia formats. In the method, an interface software system is established through a network to speed up playing of multimedia files by different multimedia players.

The interface software system provides a speeding up and near real time multimedia playing effect for sharing multimedia through the network, by which for different transmissions of multimedia files or for playing multimedia files with different formats, the multimedia player is not necessary to modify or add the software of the players to meet the streaming protocols or container. In addition, the interface software system can also provide the effect of playing the multimedia files by the players with satisfied quality and near real time performance.

In an exemplary embodiment, in order to achieve near real time sharing, waiting time is required to be decreased and playing is required to be accelerated. A transmission sequence is required to be trained for different multimedia players and for reading different multimedia formats. A method for transmitting data through a network is a mechanism of slicing an origin file into slices before transmission. However, in an exemplary embodiment, a network transmission mechanism employed at different bandwidths is further considered.

In an exemplary embodiment of the interface software, a virtual multimedia file system is provided. The file system may be a software system which exists in a form of a data block for being accessed by an upper application program.

A virtual file system is established in this exemplary embodiment. Files in the virtual file system are all located at remote devices instead of a local device. Data are obtained through network transmission by slicing an original file and then transmitting. The sequences for different multimedia players to read locations of data with different multimedia file formats are different, and thus the sequences for different multimedia players to read the slices thereof are also different.

In order to decrease the waiting time and accelerate the obtaining of a slice in which the data block is located, the different multimedia players is required to perform transmission with a special sequence according to different multimedia formats of the multimedia data slices that are required to be read, instead of an ordinary sequential transmission starting from the beginning. Combinations of various multimedia player programs and multimedia file formats are trained, to generate a database of transmission sequence.

In the multimedia transmission method introduced in this disclosure, a multimedia file format is determined, metadata of different transfer sequences is established by using data slices that are generated after slicing the multimedia file, and the different slices are transferred to each device with the aid of an available network bandwidth detection mechanism. The devices synchronize the different slices to the other devices so as to speed up a required data buffer for retrieving the multimedia for playing.

And then a transfer device slices the file sequentially according to the content of a metafile to generate multiple slices. If multiple receiving devices exist, the transfer device may equally distribute the slices to each of the devices. Shared parties which have received the slices forward the slices to other receiving devices.

The metafile records information such as a length of the original shared file, the number of slices of the file after being sliced, an offset value of each of the slices in the original file, and a name of the slice and a length thereof, so as to help another computer to read the contents in the slice for playing before obtaining all the contents.

In the process, if a current bandwidth is detected by using art algorithm at the same time, after generating the slices, the transfer device may distribute the number of slices to be transmitted to the shared parties and a transmission sequence thereof according to the currently detected residual bandwidth and a ratio thereof. Each of the shared parties which has received the slices forwards the slices to the other receiving devices.

The transfer device first sends slices that are read first during a playing process to one of the receiving devices with more residual bandwidth. And then the receiving device forwards the slices to other receiving devices with less residual bandwidth. The process of the multimedia transmission policy at a receiving device is that after receiving a metafile of a file to be shared from a transfer device, a name and a size of the original file to be shared currently are shown in a directory structure of the virtual file system, and then the shared file from the transfer device is played by a user by using player software in the virtual file system.

If the user uses player software to play the shared file from the transfer device and shown in the directory of the virtual file system and founds that a slice which is currently read for playing is absent, the receiving devices may directly requests for the slice from the transfer device according the contents of the metafile.

In addition, after receiving the metafile, the receiving device sequentially receives the slices transferred from the transfer device. If the received slices are required to be forwarded to other shared devices, the received slices are transmitted to the other receiving devices.

The method for achieving near real time multimedia sharing and transparent receiving by applying the virtual file technology is further described below with reference to the accompanying drawings. However, the disclosure is not limited hereto.

FIG. 1 is a schematic diagram illustrating architecture for achieving near real time multimedia sharing and transparent receiving according to one of the exemplary embodiments of the disclosure. This architecture includes a sharing device 110, and a shared device 130 and 140. File transmission and receive between the sharing device 110 and the shared devices 130 and 140 can be achieved through a network 120. A virtual multimedia file system 112 is established at the sharing device 110. Virtual multimedia file systems 132 and 142 are also respectively established at the shared devices 130 and 140 which are prepared to receive a shared file. Taking a multimedia file 102 as an example, the multimedia file 102 is sliced into n slices, such as Slice 1 to Slice n in the figure, which are then transmitted to a remote computer through the network and stored in a physical hard disc. While playing the multimedia file, a multimedia player of the remote computer reads, through the virtual multimedia file system in this embodiment, the contents of the multimedia file which are stored in the hard disk after being sliced.

Figure 2A:
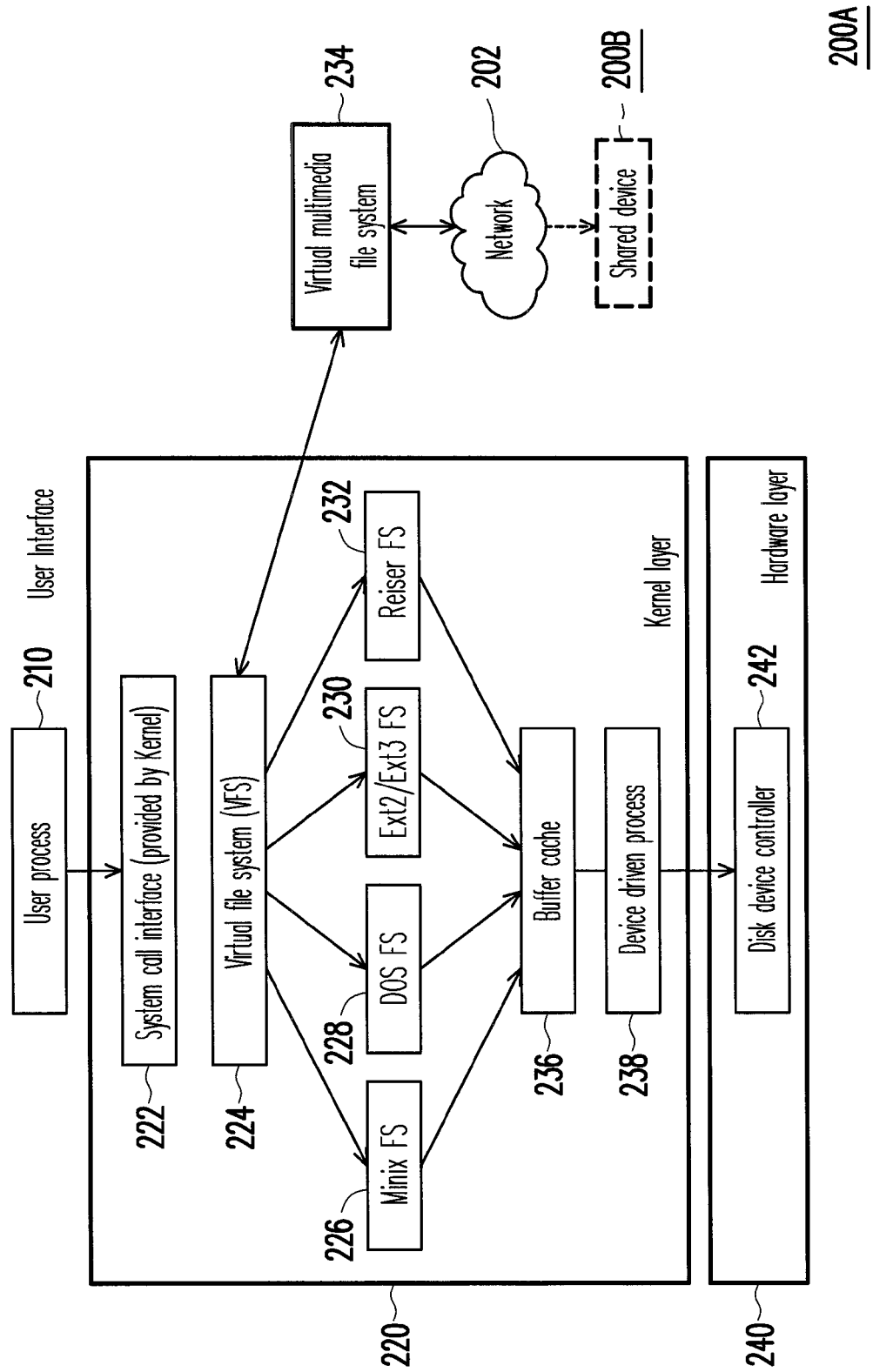
FIG. 2A is a schematic diagram illustrating architecture of a virtual multimedia file system disposed at a sharing device according to an exemplary embodiment of the disclosure.

FIG. 2A is a schematic diagram illustrating architecture of a virtual multimedia file system disposed at a sharing device according to an exemplary embodiment of the disclosure. A sharing device 200A includes a user process 210 (used as a user interface), a kernel layer 220 and a hardware layer 240. The kernel layer 220 includes a system call interface 222 and a virtual file system (VFS) 224. For example, a Linux-kernel VFS 224 establishes a correlation with a file system, such as the relation with Minix FS 226, DOS FS 228, Ext2/Ext3 FS 230 and Reiser FS 232. A buffer cache 236 is respectively connected to the file systems, and is further connected to a disk device controller 242 in the hardware layer 240 through a device driven process 238.

A virtual multimedia file system 234 provided in this embodiment is built under the VFS 224 of the kernel layer 220, and can share a multimedia file to a shared device 200B directly through a network 202. At the sharing device 200A, while playing the multimedia file, the multimedia player reads the physical file contents existing in the hard disk in a block manner through the FFS 224 in the kernel layer 220. In this embodiment, the multimedia file which practically exists in the hard disk, for example, TEST.mp4, is sliced into n slices, which are transmitted to a remote computer through the network and stored in a physical hard disk. As a result, while playing the multimedia file, a multimedia player of the remote computer is enabled to read, through the loaded virtual multimedia file system in this embodiment, the contents of the multimedia file which are stored in the hard disk after being sliced.

Figure 2B:
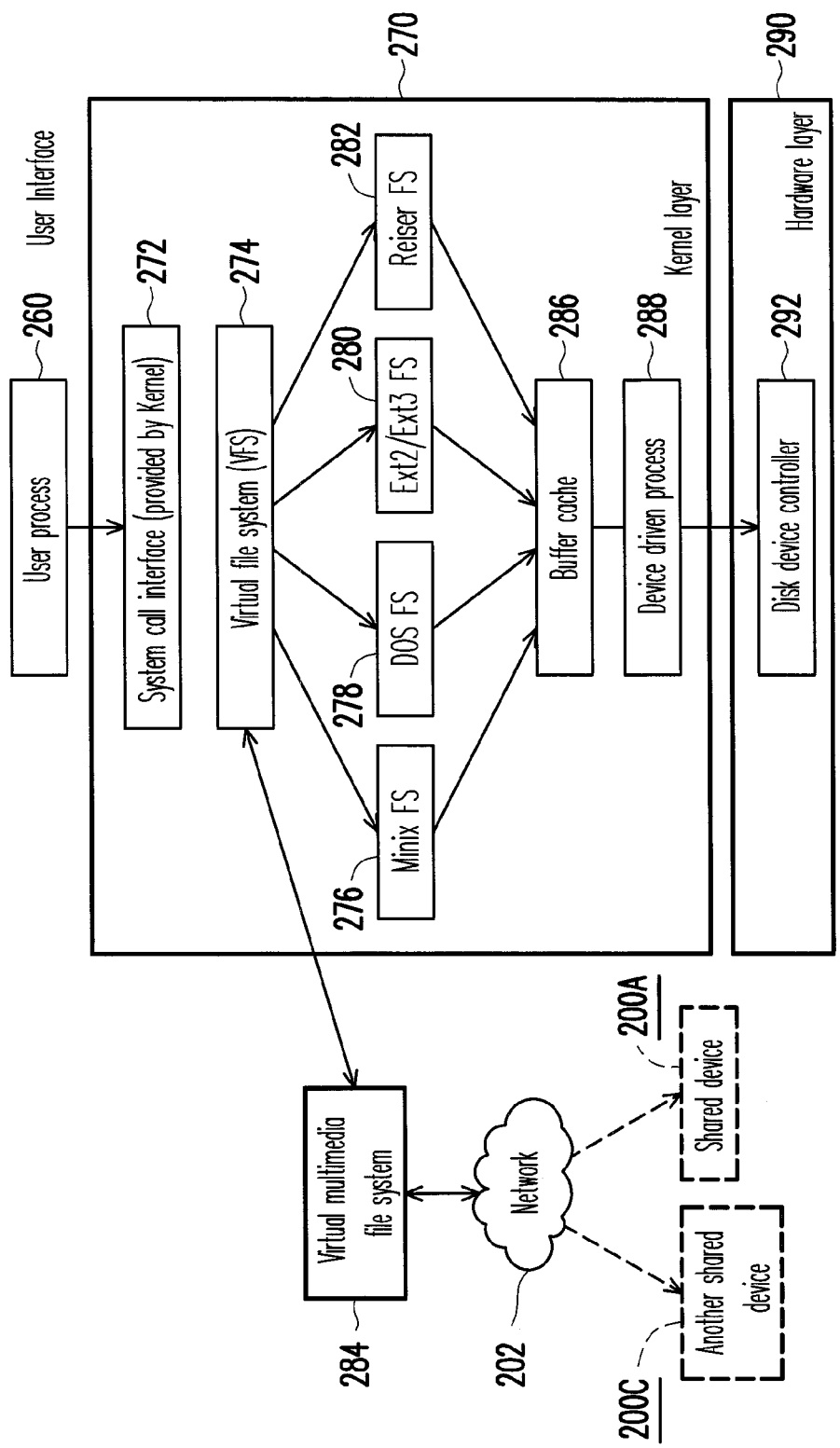
FIG. 2B is a schematic diagram illustrating architecture of a virtual multimedia file system disposed at a shared device according to an exemplary embodiment of the disclosure.

FIG. 2B is a schematic diagram illustrating architecture of a virtual multimedia file system disposed at a shared device according to an exemplary embodiment of the disclosure. The shared device 200B includes a user process 260 (used as a user interface), a kernel layer 270 and a hardware layer 290. The kernel layer 270 includes a system call interface 272 and a VFS 274. For example, a Linux-kernel virtual file system (VFS) 276 establishes a correlation with a file system such as the relation with Minix FS 278, DOS FS 280, Ext2/Ext3 FS 282 and Reiser FS 282. A buffer cache 286 is connected respectively to the file systems, and is further connected to a disk device controller 292 in the hardware layer 290 through a device driven process 288.

A virtual multimedia file system 284 provided in this embodiment is built under the VFS 274 of the kernel layer 270, and can transmit a file to the shared device 200A and another shared device 200 C directly through the network 202.

For example, a TEST.mp4 is sliced into n slices and is transmitted to a shared device, for example, the shared device 200B or 200C through the network 202. In the shared device 200B, while a multimedia player plays a multimedia file, the virtual file system 224 in the kernel layer 220 reads the contents of the multimedia file stored in the hard disk after being sliced through the virtual multimedia file system 224. For example, while playing the TEST.mp4, the n slices are read through the virtual multimedia file system 284.

With reference to FIGS. 2A and 2B, the sharing device 200A, and the shared devices 200B and 200C are used as examples. In the multimedia transmission method provided in the embodiment of the present invention, the sharing device 200A can determine a multimedia file format, establish metadata of different transfer sequences by using data slices that are generated after slicing the multimedia file, and transmit the different slices to the shared devices 200B and 200C with the aid of an available network bandwidth detection mechanism. The shared devices 200B and 200C then synchronize the different slices to other devices so as to speed up the data buffer for retrieving the multimedia for playing.

When being applied in the multimedia sharing through a network, the method can achieve the near real time sharing effect. A network device may invite devices in the other networks to establish a sharing group. A common sharing space is established by the group and each of the network devices is presented with a consistent file directory structure and contents thereof. When a network device accesses a file, another device is also presented with the change of the file system. In order to achieve the near real time sharing, a multimedia is played a short time after being chosen to be played without waiting until the whole file is transmitted.

The method introduced in the embodiment can achieve near real time multimedia sharing and transparent receiving by applying the virtual file technology. The method includes a multimedia file transmission training mechanism and a subsequent transmission method. The preceding training mechanism and the subsequent transmission method include: analyzing, by the virtual multimedia file system, a read behaviour of multimedia players on multimedia formats. Subsequently, a multimedia transmission training file is generated according to an analysis result, and then a multimedia sharing transmission policy is established according to the multimedia transmission training file. A transfer device slices the file to be shared and transmits the sliced slices to a receiving device according to the multimedia transmission policy.

In one of the embodiments, a process of generating the multimedia transmission training file is: reading a file extension-name list of the multimedia file types which are intended to be supported, and a step setting of a slice size. Subsequently, a multimedia file that is preset to be supported and a slice size thereof are respectively read according to the list, and then the file is sliced according to the slice size. Then, a multimedia player that is preset be to supported is started to record a read sequence of the slices while the file is played. If an upper limit of the slicing step is not reached, the slicing step is progressively increased, and the step of slicing the file and recording the read sequence is repeated.

In one of the embodiments of the process for generating the multimedia transmission training file, if the upper limit of the slicing step is reached, it is determined that whether the training of the multimedia file types that are preset to be supported in the list is completed. If not, the training is switched to a next file type. For the file type, the steps of slicing a file, recording a read sequence, and then progressively increasing a slice are repeated till the training of all the file types is completed. A training result is written in the multimedia transmission training file.

The multimedia transmission training file may exist as an XML file for different multimedia players. In an exemplary embodiment, part of the contents thereof may include, for example, a multimedia file format, a slice size and a read sequence of the file format.

A process at a transfer device of the multimedia transmission policy is: selecting a file to be shared, generating a metafile of the file according to a setting in the multimedia transmission training file, and then transmitting the metafile to a receiving device.

A method for establishing a multimedia transmission training file with different transmission sequences by using data slices generated after slicing a multimedia file is illustrated below with reference to FIGS. 3A to 3D.

Figure 3A:
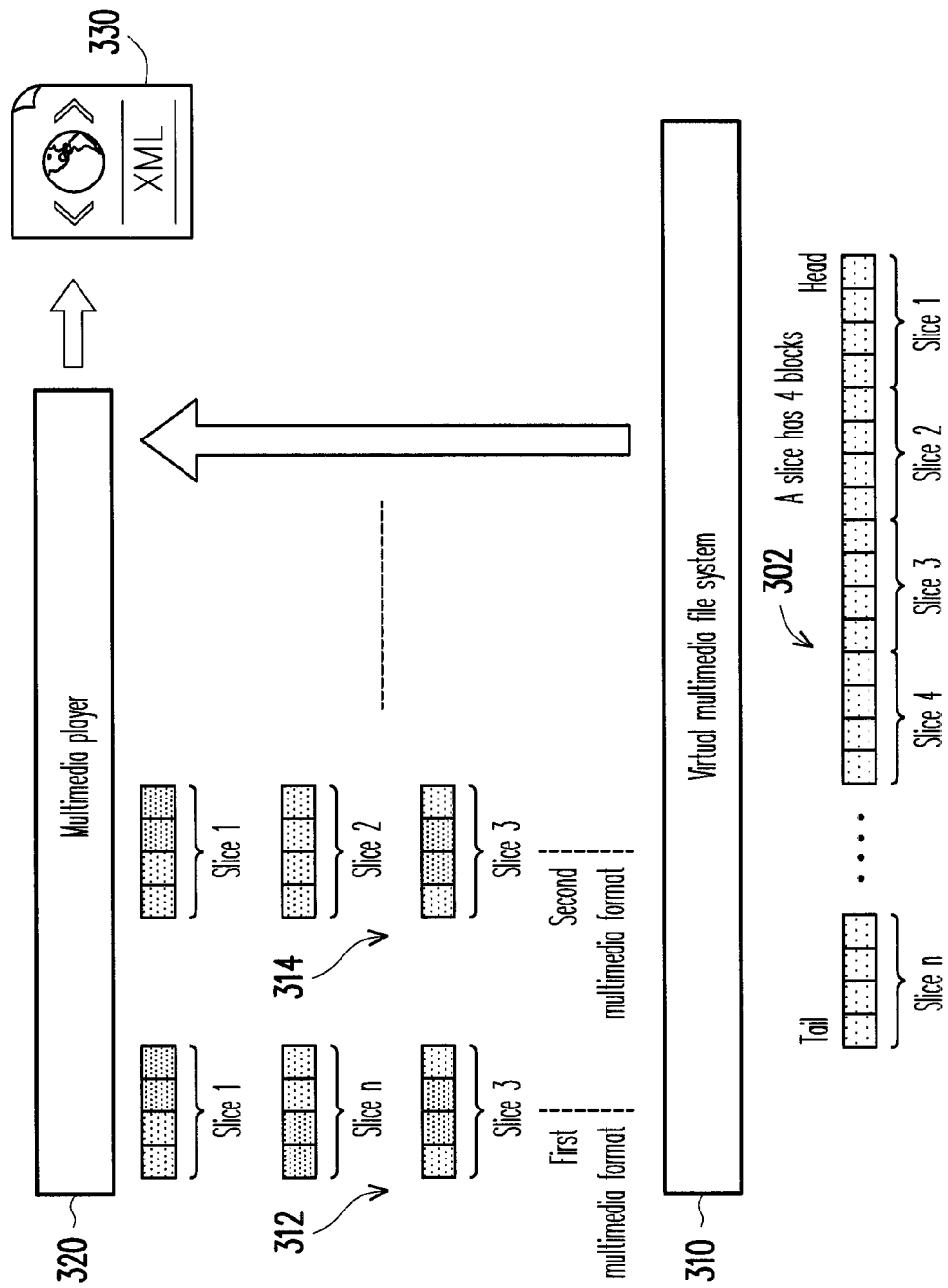
FIG. 3A is a schematic diagram illustrating transfer of different slices for being played by a virtual multimedia file system according to an exemplary embodiment of the disclosure.

FIG. 3A is a schematic diagram illustrating transmission of different slices for being played by a virtual multimedia file system according to an exemplary embodiment. Different multimedia players are found to have different read sequences while playing a multimedia file. Referring to FIG. 3A, for example, a multimedia file 302 (TEST. Mp4) is sliced into n slices. Each of the slices includes, for example, 4 blocks. The number of the blocks in each of the slices may be adjusted according to the difference of a file system. For example, for the VFS architecture shown in FIG. 2A, each of the slices may have four blocks. However, the disclosure is not limited thereto.

When a multimedia player, for example MPlayer®, is adopted to play the multimedia file 302 (TEST.mp4), first two blocks in Slice 1 may be read first, then last two blocks in the last Slice n are read, and then two intermediate blocks in the slice 3 are read. If the multimedia players is Windows Media Player®, blocks in Slice 1, and then all blocks in Slice 2, followed by blocks in Slice 3 are read sequentially.

For different multimedia formats, different multimedia players start to read and check a file at different locations. The sliced slices are required to be transmitted according to reading and checking sequences of the multimedia players. After receiving a part of data, a remote multimedia player can start the playing of the contents of the multimedia file through a virtual file system without waiting till the whole file is transmitted.

Therefore, the read sequences of various different multimedia players are analyzed and measured by the virtual multimedia file system in this embodiment. Through training, the different slice sizes of different multimedia file and sequences in different multimedia players are known; and a training file 330 is generated. The multimedia training file is stored in, such as an XML format.

It can be seen from the contents that, the reading behaviour of the multimedia players follows a rule, which may serve as a basis for the transmission of the files. FIG. 3B is a schematic flow chart illustrating reading of different multimedia files with different formats by, for example, two different types of multimedia player software. As shown in FIG. 3B, description is made with two different types of multimedia player software, i.e., a first multimedia player software 322 (Totem®) and a second multimedia player software 324 (Mplayer®) as examples. The virtual multimedia file system introduced in this embodiment reads the contents of multimedia files with different formats, and analyzes a read behaviour of the two types of multimedia players in practically reading slices of different file formats respectively.

It can be seen from FIG. 3B that, when all the file formats are played by the first multimedia player software 322, the contents of Slice 1 are read first, followed by the reading of a last slice and an intermediate slice, and then the contents in the slices after Slice 2 are read sequentially. When playing by using the second multimedia player software 324, only for the two formats .mpg and .wmv, the contents of the foregoing three slices are read before playing; and for the other formats, the rest contents are read sequentially after Slice 1 and the last slice are read.

It can be seen from table 1 below that when the last slice or an intermediate slice of a file is read, if the slice of the file is absent, both the first multimedia player software 322 and the second multimedia player software 324 can sequentially play most of video formats in case that Slice 1 of the file exists, and the last slice is required only for playing a file in a .mov format.

TABLE 1

Analysis result of read behaviours of multimedia players

| File format | Read sequence of subsequent slices | If the file is absent | |
|---|---|---|---|
| | totem 2.28.2 or mplayer | totem 2.28.2 uses GStreamer 0.10.25 | mplayer |
| .wmv | 2, 3, 5, 6, 7 | Can correctly show the time and continue to play | |
| .mpg | 2- | Show the streaming and continue to play | 16 and 8 are not captured, but has no influence, and can continue to play |
| .mp4 | 2-25, and 13 is skipped | 26 is required, otherwise a fault may occur (13 has no influence) (Your GStreamer installation is missing a plug-in.) | 26 is not captured, but has no influence thereon, and can continue to play |
| .avi | 2- | | |
| | 2- | Can correctly show the time and continue to play | 9 is not captured, but has no influence, and can continue to play |
| .mov | 2-12, and 7 is skipped | 13 is required, otherwise a fault may occur (This file is invalid and cannot be played.) | 13 is required to continue play |
| .rmvb | 2- | | |
| | 2- | 8 is required, otherwise a temporary stop may occur (4 has no influence) | 8 is not captured, but has no influence thereon, and can continue to play |

Figure 3C:
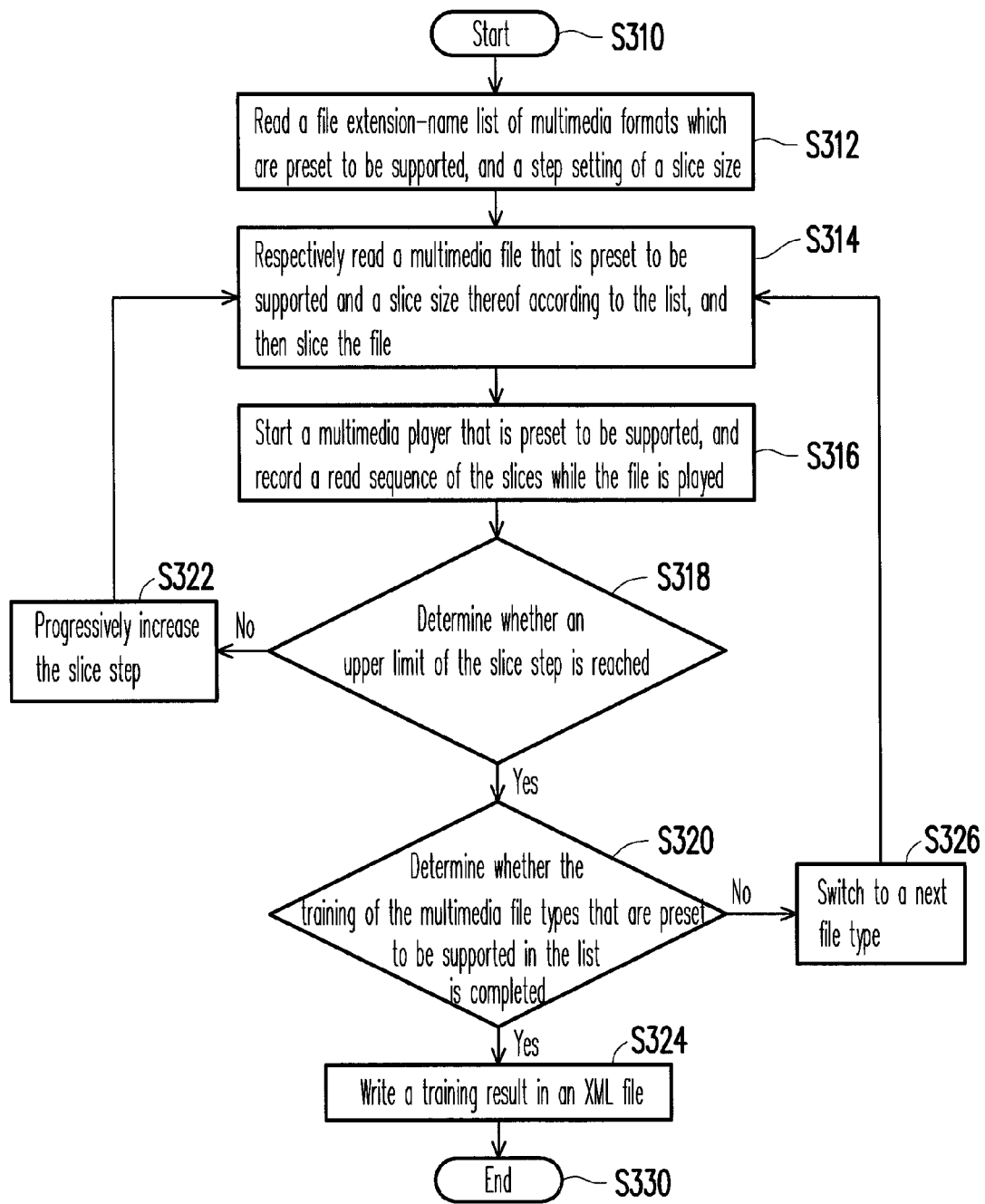
FIG. 3C is a schematic flow chart illustrating generation of a multimedia transmission training file according to one of the exemplary embodiments of the disclosure.

FIG. 3C is a schematic flow chart illustrating generation of a multimedia transmission training file according to one of the embodiments of the disclosure. Starting from step S310, and in Step 312, a file extension-name list of multimedia file types which are preset to be supported, and a step setting of a slice size. In Step S314, a multimedia file that is preset to be supported and a slice size thereof are respectively read according to the list, and then the file is sliced according to the slice size. In Step S316, a multimedia player that is preset to be supported is started to record a read sequence of the slices while the file is played. In step S318, it is determined whether an upper limit of the slicing step is reached. If not, the slicing step is progressively increased. In Step S322, the file is sliced according to the progressively increased slice size, and a read sequence thereof is recorded. When the upper limit of the slicing step is reached, in Step S320, it is determined whether the training of the multimedia file types that are preset to be supported in the list is completed. If not, in Step S326, the training is switched to a next file type to continue the slicing and training process. For the next file type, the steps (S314-S318) of slicing a file, recording a read sequence, and then progressively increasing a slicing step are repeated till the training of all the types of files is completed. Finally, in Step S324, a training result is written in an XML file.

Figure 3D:
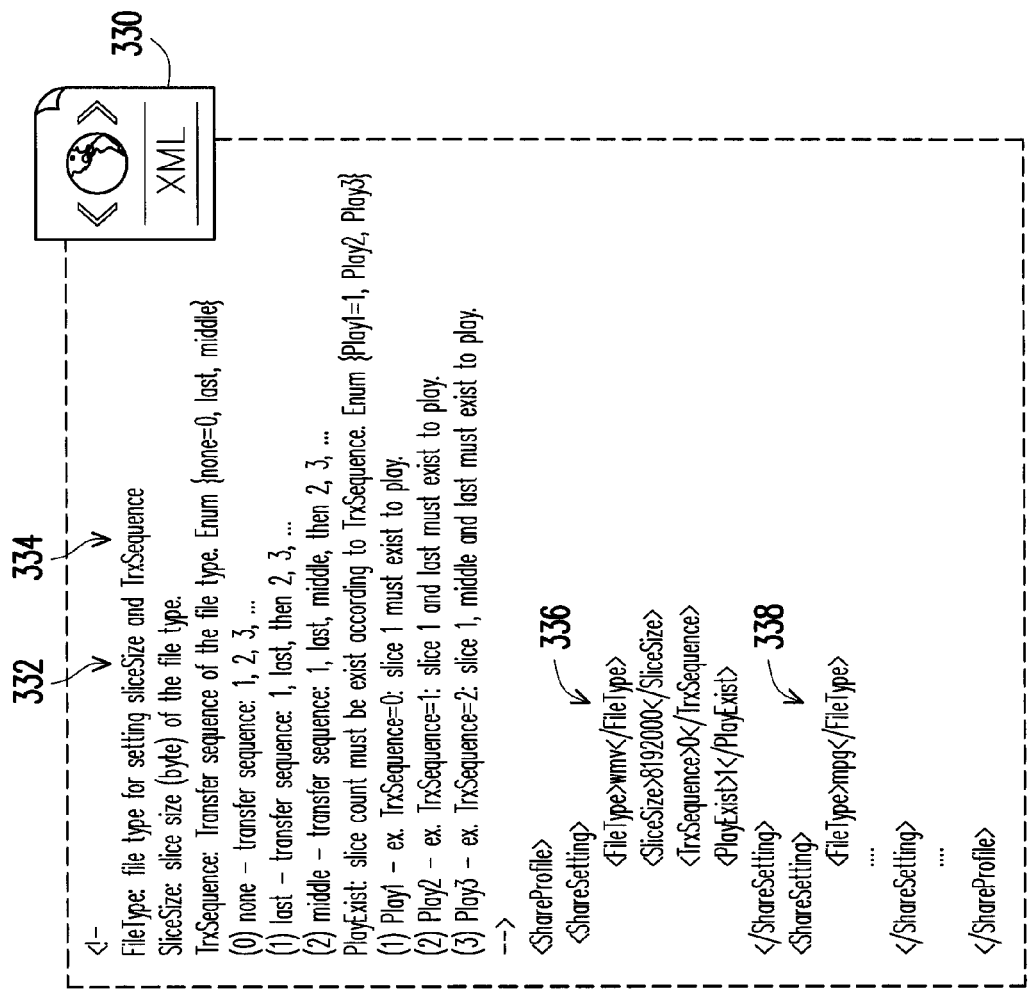
FIG. 3D is a schematic diagram illustrating a multimedia training file and contents thereof according to one of the exemplary embodiments of the disclosure.

FIG. 3D is a schematic diagram illustrating a multimedia training file 330 and contents thereof according to one of the embodiments of the disclosure. The multimedia training file 330 is an XML format file in this embodiment. In the multimedia training file 330, a slice size for a slice, a transmission sequence and a read sequence of a file may be set for a certain file format, for example, a slice size "sliceSize" of the slice marked by the numeral 332, and the transmission sequence "TrxSequence" of the slice marked by the numeral 334. In FIG. 3D, taking a file in a .wmv format as an example, as shown by the numeral 336, a multimedia file in such a format is set such that each of the sliced slices is 8192000 bytes, and the sliced slices are transmitted to a remote computer in a sequence of 01, 02, . . . , to a last slice. The file in the format can be started to be played as long as a first slice exists. In addition, another example of a file in a mpg format is also included, as shown by numeral 338.

Figure 4:
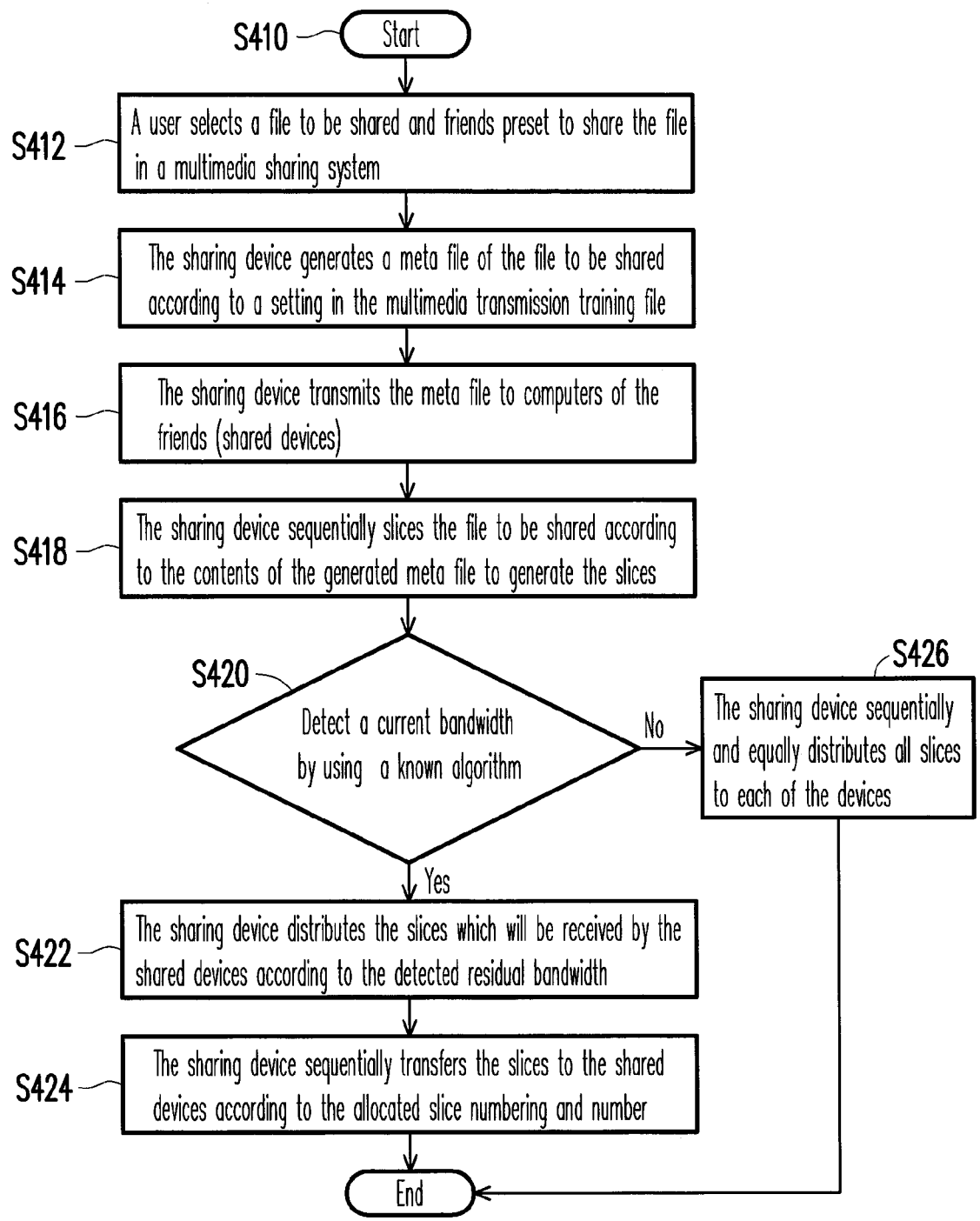
FIG. 4 is a schematic flow chart illustrating transmission of a file by a transmission device according to one of the exemplary embodiments of the disclosure.

After the transmission training file is generated, and is actually applied in multimedia sharing, a process for transferring a file by a transferring device according to one of the exemplary embodiments of the disclosure is as shown in a schematic flow chart of FIG. 4. In Step S410, transmission is started. A user selects a multimedia file to be shared from a multimedia sharing system, and selects friends preset to share the multimedia file, as described in Step S412. In Step S414, when the friends agree with the multimedia sharing, a sharing device generates a metafile of the file to be shared according a setting in the multimedia transmission training file, including a transmission sequence of the sliced slices and a slice size of the slices set for different file formats. In step 416, the metafile are transmitted to computers of the friends preset to share the file (shared devices). In Step 418, the sharing device sequentially slices the file to be shared according to the transmission sequence of the slices and the slice size of the slices in the generated metafile to generate slices of the file.

In Step S420, it is determined whether the system is further required to detect a current bandwidth by using a known algorithm. If the bandwidth detection is further performed, in Step S422, the sharing device distributes the slices which will be received by the shared devices according to detected residual bandwidths. In Step S424, the sliced slices are sequentially transmitted to the shared devices according to the allocated slice numbering and number.

If the current residual bandwidths are not detected by using a known algorithm, in Step S426, the sharing device sequentially generates the slices according to the setting in the metafile, equally distributes the slices to each of the shared devices; and once a slice is sliced by the sharing device, the slice is sequentially equally transmitted to each of the shared devices.

For a receiving device, that is to say, a shared device, a method for receiving and using the slices to achieve the near real time multimedia sharing and transparent receiving is illustrated below with reference to a file transmission method according to an exemplary embodiment of the disclosure illustrated in schematic flow charts of FIGS. 5A and 5B.

Figure 5A:
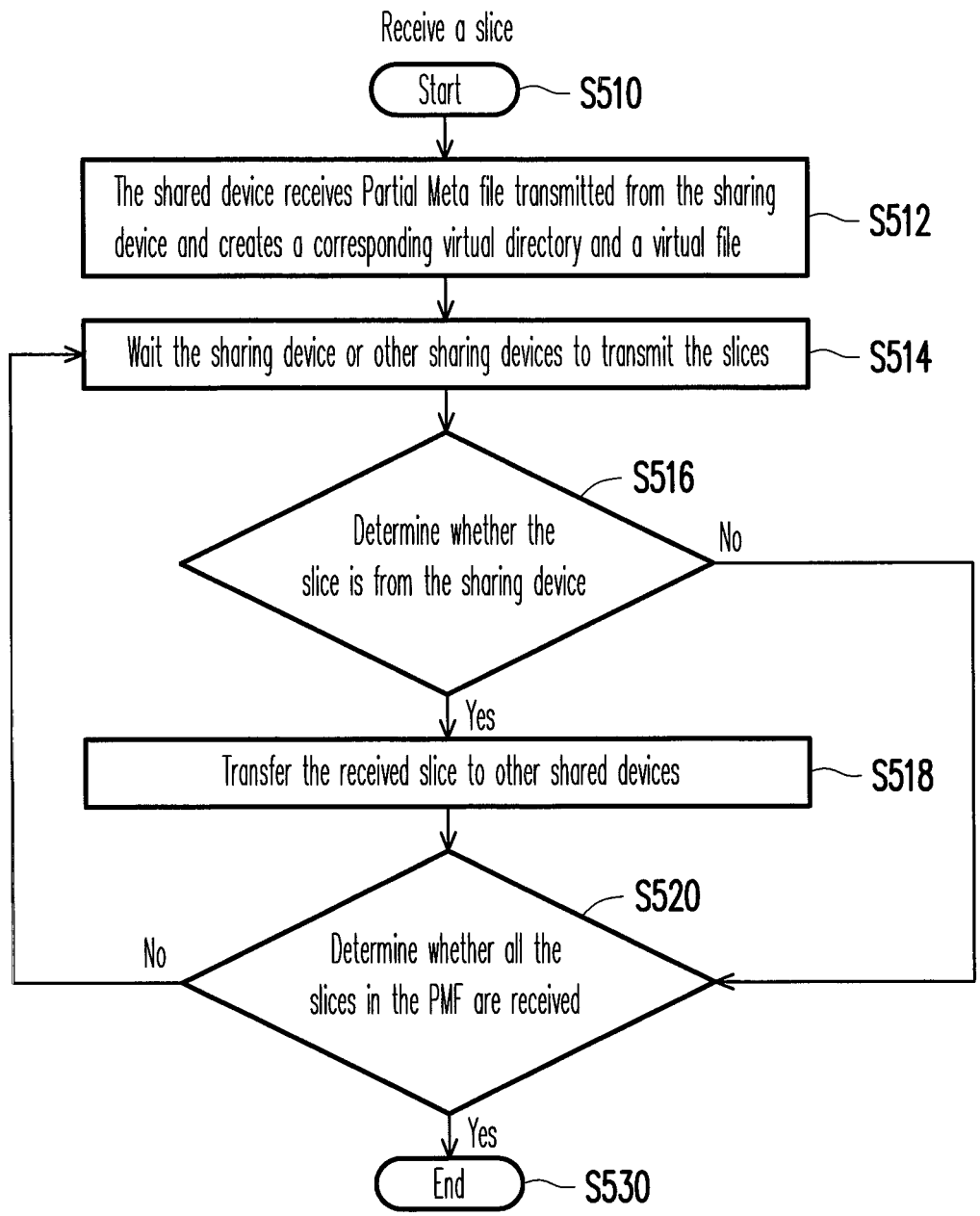
FIG. 5A and FIG. 5B are schematic flow charts illustrating a file transmission method according to one of the exemplary embodiments of the disclosure.

Referring to FIG. 5A, in Step S510, slices are started to be received. In Step S512, the shared device receives partial metafile (PMF) transmitted from the sharing device, and creates a corresponding virtual directory and virtual file, by the virtual multimedia file system introduced in this embodiment. In Step S514, the shared device waits for the slices of the file transferred by the sharing device or other shared devices. In Step S516, it is determined whether the received slices are from the sharing device. If yes, in Step S518, the received slices are transferred to other shared devices. Then, in Step S520, it is determined whether all the slices in the PMF are received. If yes, in Step S530, the slice receiving process is ended. In the determination process of Step S516, if it is determined that a received slice is not form the sharing device, in an embodiment, the received slice is not transmitted to other shared devices in the file transmission method introduced in this embodiment. That is to say, after the determination process in Step S516, Step S520 is directly performed to determine whether all the slices in the PMF are received.

Figure 5B:
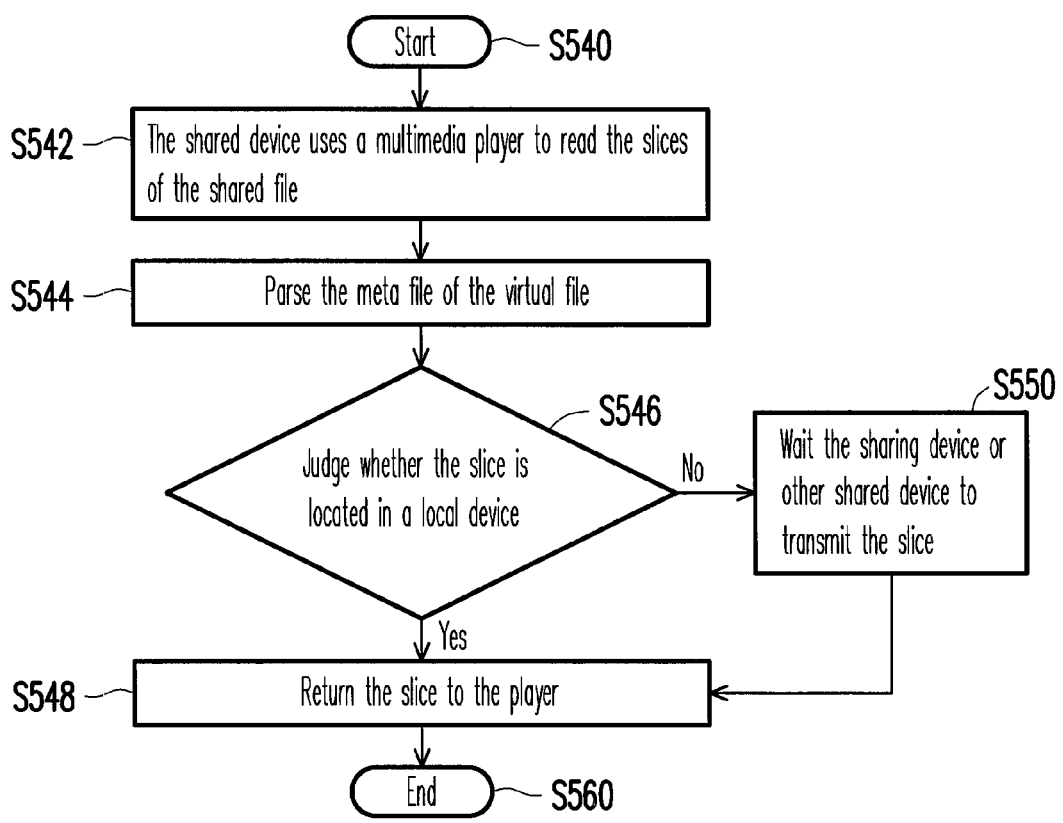

FIG. 5B is a schematic flow chart for illustrating how the shared device plays the received multimedia file according to an exemplary embodiment of the disclosure.

In Step S540, the received multimedia file is started to be played. In Step S542, the shared device uses a multimedia player to read the slices of the shared file. In Step S544, the metafile of the virtual file is parsed. In Step S516, it is determine whether the slice is located in a local device, that is, the shared device. If yes, in Step S548, the slice is returned to the multimedia player; and if not, in Step S550, the shared device waits the transmission of the slice by the sharing device or other shared devices. Then, in Step S560, the operation is ended.

Figure 6:
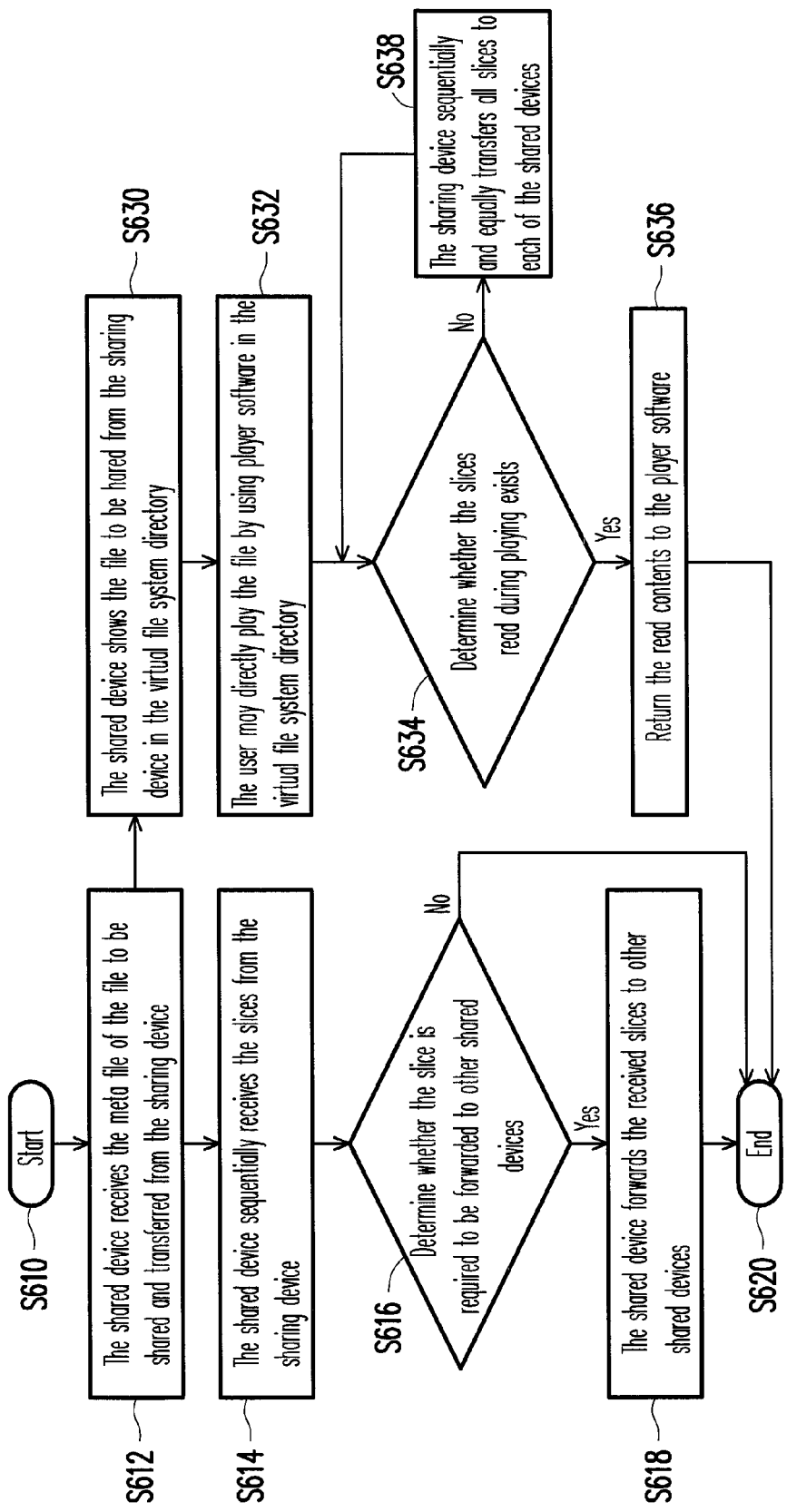
FIG. 6 is a flow chart illustrating a process at a receiving device during multimedia sharing according to one of the exemplary embodiments of the disclosure.

A method for receiving and playing, by the shared device, the slices to achieve the near real time multimedia sharing and transparent receiving may be made reference to a process flow illustrated in FIG. 6, in which the receiving of the slices and the playing of the multimedia file are carried synchronously.

FIG. 6 is a flow chart illustrating a process at a receiving device during multimedia sharing according to one of the embodiments of the disclosure. In step S610, the whole process is started. In Step 612, the shared device agrees with the multimedia sharing, and receives a metafile of a file to be shared transferred by the sharing device. In Step S614, the shared device sequentially receives other slices from the sharing device. In Step S616, it is determined whether the received slices are required to be forwarded to other shared devices. If yes, Step S618 is performed to forward the received slices to other shared devices, and then Step S620 is performed to end the process. If the received slices are not required to be forwarded to other shared devices, the process is directly ended.

However, as described in Step S612, after the shared device agrees with the multimedia sharing and receives the metafile of the file to be shared form the sharing device, if the shared device is intended to enjoy the multimedia file immediately, Step S630 is performed, in which the shared device can find an original file name and length of the shared file from the sharing device in a virtual file system directory. Then, in Step S632, a user can directly use player software to play the file through the virtual file system. In Step S634, it is determined whether a played slice exists. If not, that is to say, the read slice has not transferred from the sharing device, at this time, Step S638 is performed, in which the virtual multimedia file system of the shared device actively requests the sharing device to transmit the required slice according to the contents recorded in the metafile. If the slice exists during playing, Step S636 is performed, in which the virtual multimedia file system directly returns the contents required to be read to the player software, and then ends the playing.

Figure 7A:
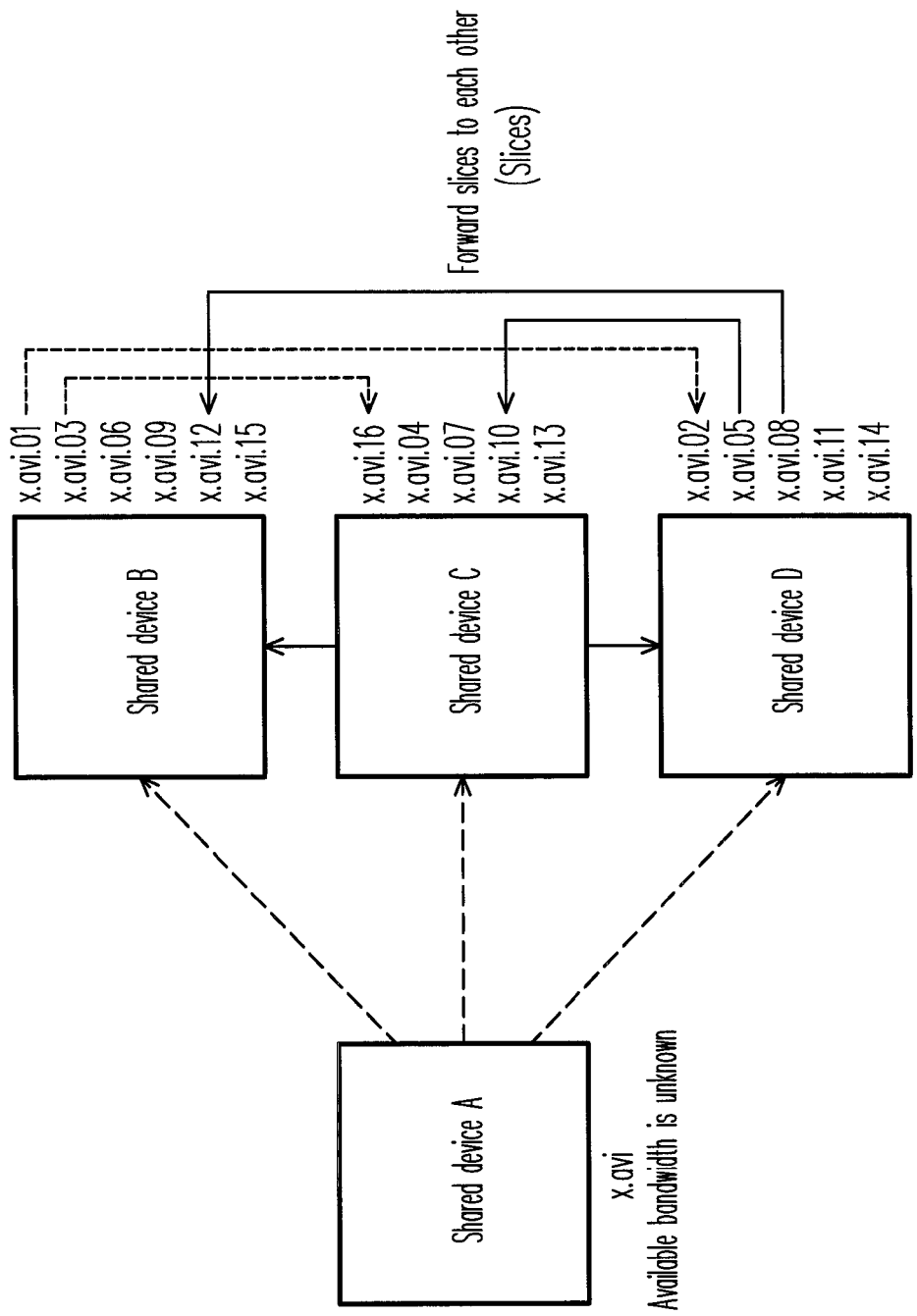
FIG. 7A is a schematic diagram illustrating a transmission policy of a transfer device according to Embodiment 1.

In addition, after analyzing the read behaviour of the multimedia player and generating the transmission training file, a multimedia sharing transmission policy is established according to the generated XML file in an exemplary embodiment of the disclosure. FIG. 7A is a schematic diagram illustrating transmission policy of a transfer device according to Embodiment 1. When a system does not use a known algorithm to detect a current bandwidth, taking x.avi in FIG. 7A as an example, it is assumed that it is found after analyzing the read behaviour of a multimedia player that when a multimedia file in the avi format is played, a read sequence is from a first sliced slice to a last slice. If the number of the sliced slices is 16, a transfer device sequentially and equally distributes and transmits the sliced slices to each receiving device according to a multimedia transmission training file generated after the analysis. A transfer device A first transfers a sliced slice x.avi.01 to a receiving device B. After receiving the slice x.avi.01, the receiving device B relay forwards the slice x.avi.01 to a receiving device C and D. At the same time, the transfer device A continues to transfer a second sliced slice x.avi.02 to the receiving device C. After receiving the slice x.avi.02, the receiving device C relay forwards the slice x.avi.02 to the receiving device B and D, and so on. When the transfer device sequentially slices the slices according to different file formats and transmits the slices to the receiving devices, each of the receiving devices that has received the slices relay forwards the received slices to each other.

Figure 7B:
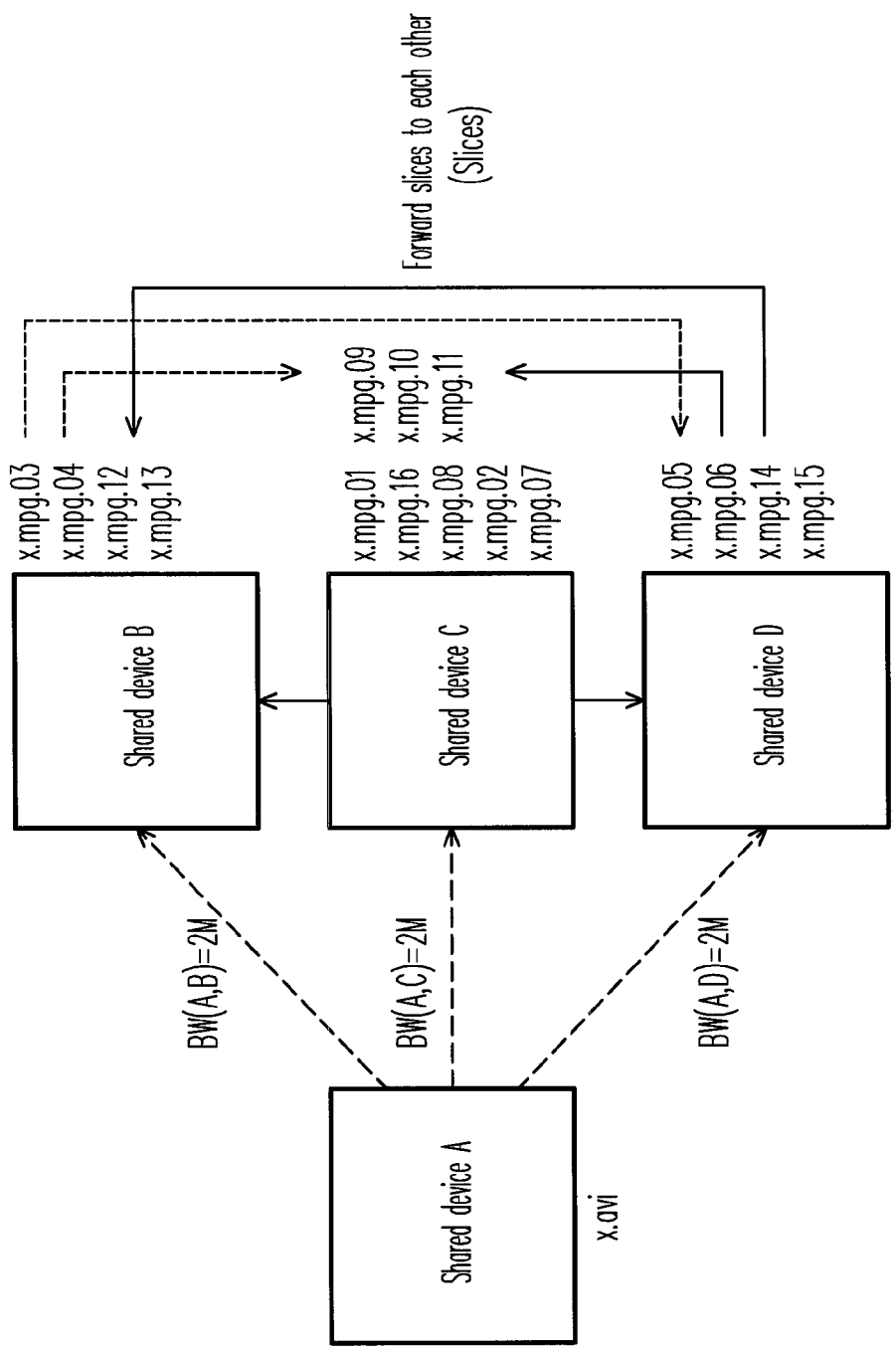
FIG. 7B is a schematic diagram illustrating a transmission policy of a transfer device according to Embodiment 2.

FIG. 7B is a schematic diagram illustrating a transmission policy of a transfer device according to Embodiment 2. When a current residual bandwidth between the transfer device A and the receiving devices B, C, and D is detected by a system by using a known algorithm, and is respectively 2 M bps, 4 M bps and 1 M bps, taking a file x.mpg as an example, it is assumed that it is found after analyzing the read behaviour of a multimedia player that when a multimedia file in the mpg format is played, a read sequence is that the contents of a first slice (x.mpg.01) is read first, then the contents of a last slice (x.mpg.16) is read, which is followed by the reading of the contents of an intermediate slice (x.mpg.08), and subsequently, the contents of a second, a third, and a last slice are read sequentially. The transfer device establishes a transmission policy according to a multimedia transmission training file that is generated after analysis and the transmission policy is generating a first slice x.mpg.01 by slicing, and transmitting the slice to the receiving device C that has a largest residual bandwidth; then generating a slice x.mpg.16 that is read subsequently by slicing, and transmitting the slice to the receiving device B that has a sub-largest residual bandwidth, and then generating a slice x.mpg.08 that is read next by slicing, and transmitting the slice to the receiving device D that has a lowest residual bandwidth, and so on. The transfer device A distributes and transmits the numbering and the number of the slices to be transmitted to the receiving devices B, C and D according to the residual bandwidths and a ratio thereof. The number of the slices distributed to each of the receiving device X is: BW(A,X)/(BW(A,B)+BW(A,C)+BW(A,D)). At the same time, after receiving the slices transmitted from the transfer device A, the receiving devices B, C and D relay forward the received slices to each other. In this way, the network bandwidth can be effectively utilized. A file transmission bottleneck that occurs when all slices are transmitted from the transfer device to all the receiving devices and the network rate of the transfer device is slow is avoided. The additional applications of the detection of current residual bandwidths and the file relay transmission between the receiving devices further speed up the real time sharing of a multimedia file from the transfer device.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A multimedia file sharing method, comprising:
    establishing a virtual multimedia file system at a sharing device;
    performing, by the virtual multimedia file system, a multimedia file transmission training process, to create a multimedia transmission training file, wherein the multimedia transmission training file comprises a plurality of different settings of slice sizes and read sequences for a plurality of different software multimedia players and different multimedia file formats;

when a first multimedia file is to be shared, generating a corresponding metafile according to the multimedia transmission training file and slicing the first multimedia file into a plurality of slices according to the setting of the slice size corresponding to the multimedia file format of the first multimedia file; and transferring the metafile to each one or more shared devices so as to enable the one or more shared devices to sequentially obtain the plurality of slices of the first multimedia file according to the setting of the read sequence corresponding to the software multimedia player of each one or more shared devices.

2. The multimedia file sharing method according to claim 1, wherein the multimedia file transmission training process comprises:

analyzing, by the virtual multimedia file system, read behaviors of the different software multimedia players on the different multimedia formats to generate the multimedia transmission training file;

establishing a multimedia sharing transmission process according to the multimedia transmission training file; and storing, by the sharing device, contents of the first multimedia file to be shared in a storage medium of the one or more shared devices according to the multimedia sharing transmission process.

3. The multimedia file sharing method according to claim 2, wherein a method for generating the multimedia transmission training file comprises:

reading a file extension-name list of the different multimedia formats which are preset to be supported and step settings of the slice sizes;

respectively reading, according to the list, at least one multimedia file and the slice size thereof which meets each of the multimedia formats, and slicing the at least one multimedia file according to the step setting of the slice size corresponding to the multimedia format of each of the at least one multimedia file; and starting the software multimedia players which are preset to be supported, recording the read sequence of the sliced slices of the at least one multimedia file while playing the at least one multimedia file, and creating the read sequence.

4. The multimedia file sharing method according to claim 1, wherein the metafile comprises a length of the first multimedia file to be shared, the number of the slices after being sliced, an offset value of each of the slices in the first multimedia file, and a file name of the slice and a length thereof.

5. The multimedia file sharing method according to claim 1, wherein a method for transferring the slices to the one or more shared devices comprises:

detecting a transmission bandwidth between the sharing device and the one or more shared devices by using an algorithm; and determining the number of the slices to be transmitted to the one or more shared devices and the read sequence thereof according to the detected transmission bandwidth by using a residual bandwidth and a ratio thereof, and then forwarding, by part of the shared devices that have received the slices, the slices to the other shared devices that have not received the slices.

6. The multimedia file sharing method according to claim 5, wherein the method for transferring the slices to the one or more shared devices further comprises:

determining which part of the slices of the first multimedia file to be shared are read first in part of the shared devices; and reserving the residual bandwidth with a priority for the part of the slices that are read first for transmission.

7. The multimedia file sharing method according to claim 1, further comprising:

obtaining, by the one or more shared devices, a part of the slices according to the metafile through the virtual multimedia file system; and playing the obtained part of slices and synchronously obtaining the other slices corresponding to the first multimedia file.

8. The multimedia file sharing method according to claim 7, further comprising obtaining, by the one or more shared devices, the slices according to the corresponding read sequence in the metafile.

9. The multimedia file sharing method according to claim 1, wherein after receiving the metafile of the first multimedia file to be shared from the sharing device, a name and a size of the first multimedia file to be shared currently is shown in a directory structure of the virtual multimedia file system, and the first multimedia file is directly played by player software of the one or more shared devices; and when a part of the slices of the first multimedia file is found absent, the one or more shared devices directly request for the slices from the sharing device according to the contents of the metafile.

10. The multimedia file sharing method according to claim 1, wherein after receiving the metafile of the first multimedia file to be shared, one of the shared devices sequentially receives the slices corresponding to the first multimedia file and transferred from the sharing device; and the one shared device determines whether to forward the received slices to the other shared devices.

11. A multimedia file sharing system, comprising:

a first device, comprising a first virtual multimedia file system and a first storage medium, wherein the virtual multimedia file system performs a multimedia file transmission training process to create a multimedia transmission training file comprising a plurality of different settings of slice sizes and read sequences for a plurality of different software multimedia players and different multimedia file formats, and stores the multimedia transmission training file in the first storage medium, the first virtual multimedia file system generates a metafile corresponding to a first multimedia file to be shared according to the multimedia transmission training file and slices the first multimedia file into multiple slices according to the setting of the slice size corresponding to the multimedia file format of the first multimedia file; and a second device, comprising a second virtual multimedia file system, a second software multimedia player and a second storage medium, wherein the second device communicates with the first device through a network, wherein while playing the first multimedia file by the second software multimedia player, the second device obtains the corresponding slices sequentially according to the setting of the read sequence corresponding to the second software multimedia player, and temporarily stores the slices in the second storage medium of the second device, and then sequentially plays the slices according to the metafile through the second virtual multimedia file system.

12. The multimedia file sharing system according to claim 11, wherein the generating of the multimedia transmission training file by the first device comprises:
- reading a file extension-name list of the different multimedia formats which are preset to be supported and step settings of the slice sizes;
- respectively reading, according to the list, at least one multimedia files and the slice size thereof which meets each of the multimedia formats, and slicing the at least one multimedia file according to the step setting of the slice size corresponding to the multimedia format of each of the at least one multimedia file; and
- starting the software multimedia players which are intended to be supported, recording the read sequence of the slices of the at least one multimedia file while playing the at least one multimedia file, and creating the read sequence.

13. The multimedia file sharing system according to claim 11, wherein the meta data comprises a length of the first multimedia file to be shared, the number of the slices after being sliced, an offset value of each of the slices in the first multimedia file, and a file name of the slice and the length thereof.

14. The multimedia file sharing system according to claim 11, wherein the first device detects a transmission bandwidth by using an algorithm, and determines the number of the slices to be transmitted and the read sequence thereof according to the detected transmission bandwidth by using a residual bandwidth and a ratio thereof.

15. The multimedia file sharing system according to claim 11, wherein after the second device receives the metafile of the first multimedia file to be shared from the first device, a name and a size of the first multimedia file to be shared currently is shown in a directory structure of the second virtual multimedia file system, and the first multimedia file is directly played by the second software multimedia player, wherein when a part of the slices of the first multimedia file is found absent, the second device requests for the slices according to the contents of the metafile.

16. The multimedia file sharing system according to claim 11, wherein the second device obtains part of the slices according to the metafile through the second virtual multimedia file system, respectively plays the obtained part of slices, and synchronously obtains the other part of the slices corresponding to the first multimedia file.

17. The multimedia file sharing system according to claim 16, wherein the second device obtains the slices according to the corresponding read sequence in the metafile.

18. The multimedia file sharing system according to claim 11, wherein after the second device receives the metafile of the first multimedia file, the second device sequentially receives the slices corresponding to the first multimedia file and transferred from the first device, and the second device determines whether to forward the received slices.

19. The multimedia file sharing system according to claim 11, further comprising:
- a third device, comprising a third virtual multimedia file system, a third software multimedia player and a third storage medium, wherein the third device communicates with the first device and the second device through a network, wherein while playing the first multimedia file by the third software multimedia player, the third device obtains the corresponding slices from the first device or the second device according to the setting of the read sequence corresponding to the third software multimedia player, temporarily stores the slices in the third storage medium, and then sequentially obtains the corresponding slices by the third virtual multimedia file system.

20. The multimedia file sharing system according to claim 19, wherein the first device detects a transmission bandwidth by using an algorithm, and determines the number of the slices to be transmitted and the read sequence thereof according to the detected transmission bandwidth by using a residual bandwidth and a ratio thereof, determines which part of the slices of the first multimedia file are read first in the second device or the third device and preferentially reserves the residual bandwidth for the part of the slices that are read first for transmission.

21. A multimedia file sharing system, comprising:
- a sharing device, comprising a first virtual multimedia file system, wherein the virtual multimedia file system performs a multimedia file transmission training process to create a multimedia transmission training file comprising a plurality of different settings of slice sizes and read sequences for a plurality of different multimedia players and different multimedia file formats, the first virtual multimedia file system generates a metafile corresponding to a first multimedia file to be shared according to the multimedia transmission training file and slices the first multimedia file into multiple slices according to the setting of the slice size corresponding to the multimedia file format of the first multimedia file; and
- multiple shared devices, wherein each of the shared devices comprises a second virtual multimedia file system, a software multimedia player and a storage medium, wherein the shared devices communicate with the sharing device through a network, wherein when any one of the shared devices plays the first multimedia file, the shared device sequentially obtains the corresponding slices from the sharing device or the other shared devices in a sequence according to the setting of the read sequence corresponding to the software multimedia player, and temporarily stores the slices in the storage medium.

* * * * *